United States Patent [19]
Clarke

[11] Patent Number: 5,453,988
[45] Date of Patent: Sep. 26, 1995

[54] PASSIVE OPTICAL NETWORK

[75] Inventor: Donald E. A. Clarke, Colchester, England

[73] Assignee: British Telecommunications public limited company, London, England

[21] Appl. No.: 859,481

[22] PCT Filed: Jan. 23, 1991

[86] PCT No.: PCT/GB91/00100

§ 371 Date: Jun. 16, 1992

§ 102(e) Date: Jun. 16, 1992

[87] PCT Pub. No.: WO91/11867

PCT Pub. Date: Aug. 8, 1991

[30] Foreign Application Priority Data

Jan. 24, 1990 [GB] United Kingdom .................. 9001595

[51] Int. Cl.[6] ................................................. H04J 3/16
[52] U.S. Cl. ................................... 370/95.3; 359/110
[58] Field of Search ............................ 370/95.3, 95.1, 370/95.2, 85.1, 85.2; 455/15, 54.1, 51.1, 53.1, 54.1; 359/109, 110, 113, 115, 116, 117, 118, 121, 123, 171

[56] References Cited

U.S. PATENT DOCUMENTS

| | | | |
|---|---|---|---|
| 4,408,307 | 10/1983 | Harris | 367/79 |
| 4,498,169 | 2/1985 | Rozmus | 370/85.1 |
| 4,722,093 | 1/1988 | Tejima | 370/95.3 |
| 4,768,188 | 8/1988 | Barnhart et al. | 370/95.3 |
| 4,823,312 | 4/1989 | Michael et al. | 364/900 |
| 5,241,545 | 8/1993 | Natarajan et al. | 370/95.3 |

FOREIGN PATENT DOCUMENTS

| | | |
|---|---|---|
| 0229684 | 7/1987 | European Pat. Off. . |
| 0253381 | 1/1988 | European Pat. Off. . |
| 8905070 | 6/1989 | European Pat. Off. . |
| 9106157 | 5/1991 | European Pat. Off. . |
| 9108623 | 6/1991 | European Pat. Off. . |

*Primary Examiner*—Douglas W. Olms
*Assistant Examiner*—Dang Ton
*Attorney, Agent, or Firm*—Nixon & Vanderhye

[57] ABSTRACT

A head-end station for a passive optical network system is arranged to transmit and receive downstream and upstream multiplex data frames. The data frames include a plurality of basic frames, each basic frame including a plurality of traffic bits and a plurality of control bits. The head-end station includes a data receiver having a control processor arranged to receive control data, a control data buffer which provides a parallel data input to the control processor, a traffic interface and a serial-to-parallel converter. The converter receives upstream TDMA multiplexed frames and the parallel output from the converter is connected in parallel to the respective inputs of the control data buffer and the traffic interface. A data transmitter for such a head-end station also includes a control processor, a control buffer and a traffic interface. A parallel-to-serial converter receives the upstream TDMA. The parallel input to the converter is connected in parallel to the control data buffer and to the exchange interface. In a preferred aspect of the invention, the upstream and downstream TDMA frames include a header portion preceding the plurality of basic frames and the control data buffers are enabled both during the header portion and during the portions of the basic frames containing the control bits.

12 Claims, 4 Drawing Sheets

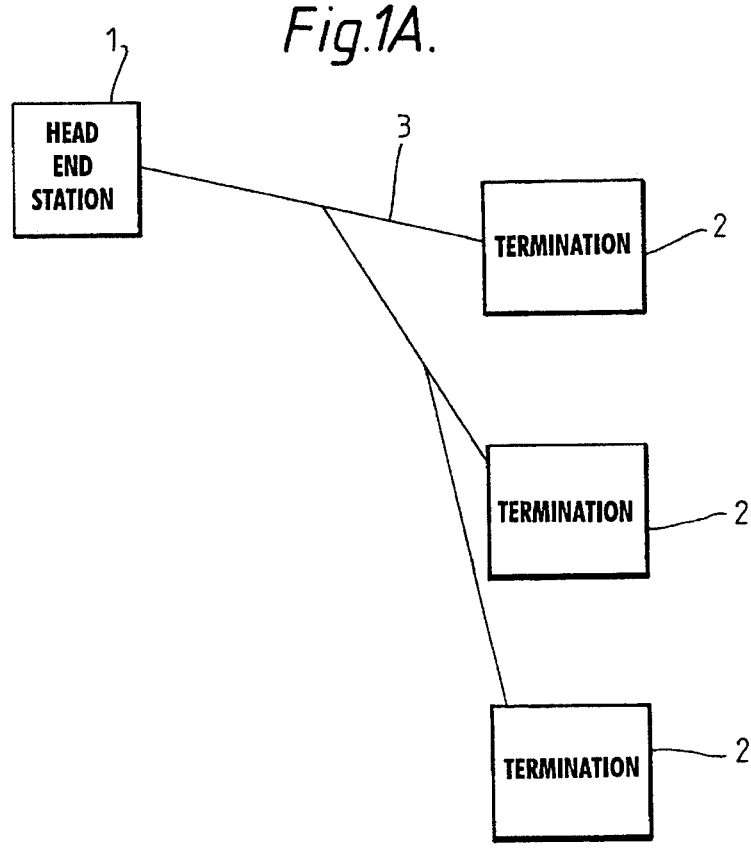
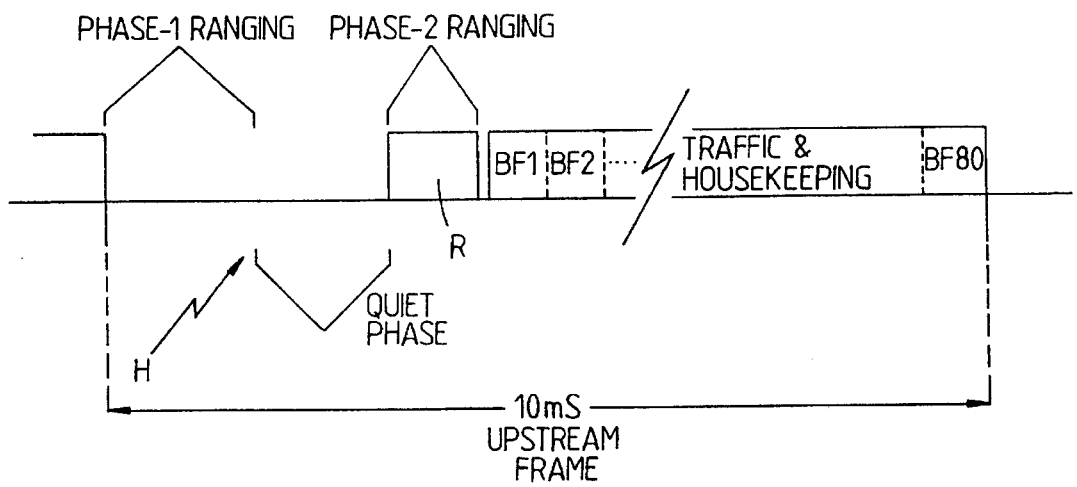

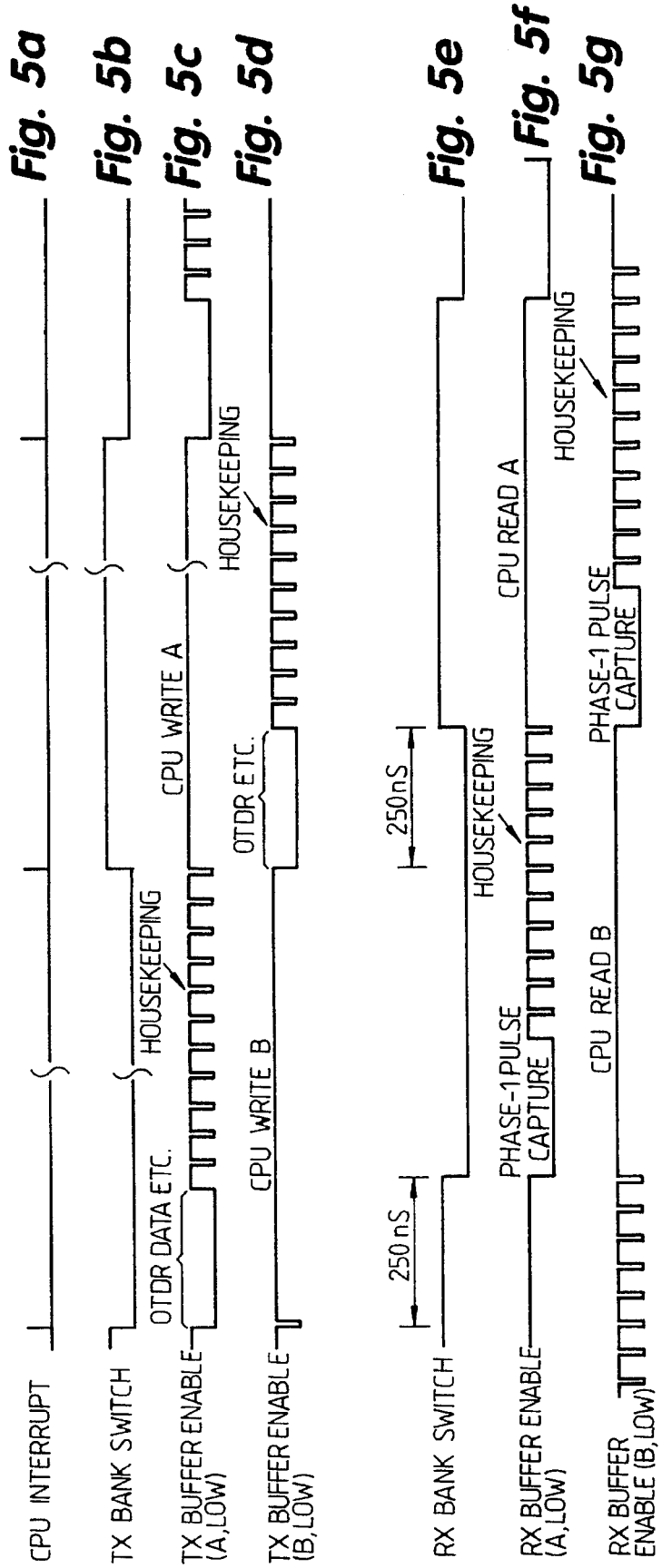

PASSIVE OPTICAL NETWORK

BACKGROUND OF THE INVENTION

1. Field of the Invention

The present invention relates to a passive optical network, and in particular to a head-end station for use in such a network.

2. Related Art

The present applicant has developed a bit transport system (BTS) for use in a TPON (telephony on a passive optical network) network. In this bit transport system a head-end station broadcasts time division multiple access (TDMA) frames to all the- terminations on the network. The transmitted frames include both traffic data and control data. Each termination recognises and responds to an appropriately addressed portion of the data in the broadcast frame and ignores the remainder of the frame.

In the upstream direction, each termination transmits data in a predetermined time slot and the data from the different terminations are assembled at the head-end into a TDMA frame of predetermined format.

Typically each TDMA frame includes a header containing bits relating to system functions such as coarse or fine ranging followed by a number of basic frames carrying the traffic data. In the preferred embodiment described below, each basic frame is 2496 bits long, comprising 2352 traffic bits followed by 144 control bits. The control bits may be used by the head-end station, for example, to control the timing and amplitude of the transmissions from the terminations on the network. The appropriate control data is generated by a CPU within the head-end station. On the transmit side of the head-end station it is therefore necessary to assemble the control and traffic data from different sources to form the basic frames. A corresponding function is required for the return data, with it being necessary to split the received frames into traffic and control data.

BRIEF SUMMARY OF THE INVENTION

According to a first aspect of the present invention, there is provided a head-end station for a passive optical network system arranged to transmit and receive downstream and upstream TDMA frames including a plurality of basic frames, each basic frame comprising a plurality of traffic bits and a plurality of control bits, the head-end station including a data receiver comprising a control processor arranged to receive control data, a control data buffer arranged to provide a parallel data input to the control processor, a traffic interface arranged to receive traffic data and a serial-to-parallel converter arranged to receive incoming TDMA frames, the parallel output from the serial-to-parallel converter being connected in parallel to the respective inputs of the control data buffer and the traffic interface.

The present invention provides a structure for the data receivers and transmitters within the head-end station which is ideally adapted to the interleaving of control and traffic data within the TDMA frame and enables the use of such frame structures without requiring complex multiplexers or de-multiplexers. In the past the use of such multiplexers or de-multiplexers in the input and output stages have provided a bottleneck which seriously restricted the performance of the system.

Typically the traffic interface is an- exchange interface handling telephone traffic.

Preferably the upstream TDMA frames include a header preceding the plurality of basic frames and the control data buffer is arranged to read data from the serial-to-parallel converter both during the header portion and subsequently during the portions of the basic frames comprising the control bits. Preferably the header includes a phase-1 ranging portion as herein defined, and the control data buffer is arranged to capture any ranging pulses received in the phase-1 ranging portion.

The structure adopted in the present invention is found to be particularly advantageous when the frames include a header used for system control functions as well as the control bits associated with each of the basic frames. The present invention makes it possible to capture and process both these forms of data using the same hardware, thereby reducing the cost of that hardware and further simplifying the control procedures. It is found to be particularly advantageous when the header includes phase-1 ranging pulses since it is then possible to capture and process those pulses without requiring additional hardware.

Phase-1 ranging pulses are used for coarse adjustment of the timing of transmissions from the terminations to compensate for their different loop delays. This is described in further detail in the present applicant's U.S. application Ser. No. 07/859,413, filed May 26, 1992 now U.S. Pat. No. 5,353,143 which corresponds to British application No. 8923488.4 entitled "Optical Receiver".

Preferably the control data buffer comprises a pair of memory buffers connected in parallel between the serial-to-parallel converter and respective inputs of the control processor, when one of the memory buffers is being written to, the control processor being arranged to read data from the other of the memory buffers. Preferably the memory buffers are video line memory buffers.

According to a second aspect of the present invention there is provided a head-end station for a passive optical network system arranged to transmit and receive downstream and upstream TDMA frames including a plurality of basic frames, each basic frame comprising a plurality of traffic bits and a plurality of control bits, the head-end station including a data transmitter comprising a control processor arranged to transmit control data, a control data buffer arranged to receive a parallel data stream from the control processor, a traffic interface arranged to transmit traffic data and a parallel-to-serial converter arranged to transmit outgoing TDMA frames, the parallel input to the parallel-to-serial converter being connected in parallel to the respective outputs of the control data buffer and the traffic interface.

Preferably the downstream TDMA frames include a header preceding the plurality of basic frames and the control data buffer is arranged to write data to the parallel-to-serial converter both during the header portion and subsequently during the portions of the basic frames comprising the control bits.

Preferably the header includes a system diagnostic portion and the control data buffer is arranged to output system diagnostic pulses in the system diagnostic portion.

Just as on the receive side it is found to be particularly advantageous to use a control data buffer both for the control portions of the basic frames and for the header portion, so similar advantages arise from the use of an analogous structure on the transmit side. The header in the downstream frames may include pulses which are transmitted onto the network in order to monitor the state of the network. In particular, these system diagnostic pulses may take the form of an optical time domain reflectometry (OTDR) probe, formed from encoded pulses having an appropriate autocorrelation function. The transmission of such pulses makes it possible, for example, to detect faults in the fibre optic network.

Preferably the control data buffer comprises a pair of memory buffers connected in parallel between the parallel-to-serial converter and respective outputs of the control processor, when one of the memory buffers is writing data, the control processor being arranged to write data to the other of the memory buffers. Preferably the memory buffers are video lane memory buffers.

BRIEF DESCRIPTION OF THE DRAWINGS

A head-end station in accordance with the present invention will now be described in detail with reference to the figures of the accompanying drawings in which:

FIG. 1A is a block diagram showing a TPON network;

FIG. 1B is a diagram showing the structure of an upstream TDMA frame;

FIGS. 5a–5g are timing diagrams for the circuits of FIGS. 3 and 4.

DETAILED DESCRIPTION OF EXEMPLARY EMBODIMENTS

A TPON network comprises a head-end station 1, a number of terminations 2, and a passive optical fibre network 3 linking the head-end station i to the terminations 2. Although, for clarity, only three terminations are shown, in practice many more terminations will be connected to a single head-end station. Typically the head-end station is located in a local telephone exchange and the terminations 2 are subscriber stations in domestic or commercial premises or street cabinets in the neighbourhood of the local exchange.

The head-end station 1 broadcasts data over the fibre network 3 as time division multiple access (TDMA) frames having a predetermined format. The frames include control channels addressed to specific ones of the terminations 2 to control, amongst other parameters, the amplitude and timing of the optical signals transmitted onto the fibre network 3 by the terminations 2.

In the upstream direction, each termination 2 transmits data in a predetermined time slot, which data is assembled into a TDMA frame at the head-end station 1. Since the TPON network is synchronous in operation it is necessary to control the timing of the terminations both to compensate for the different delays associated with different positions of the terminations on the fibre network 3 and to correct -for any variation in the delay and amplitude arising, for example, from local fluctuations in the temperature of the network.

FIG. 1B shows the format of the return frame. Traffic data is transmitted to the head-end station in 80 basic frames BF1 ... BF80. The basic frames BF1 ... BF80 are preceded by a header H which includes a phase-2 ranging section R 720 bits long. Each termination 2 is arranged to transmit onto the fibre network 3 a ranging bit timed to arrive at a predetermined position within the ranging section R. The head-end station I determines the phase of each arriving ranging pulse and then transmits control signals to the respective termination 2 to retard or advance the timing of the transmission from that termination 2 in order to minimise the phase offset between the received data from that termination and the intended position of that data within the return frame structure.

Figure 2:
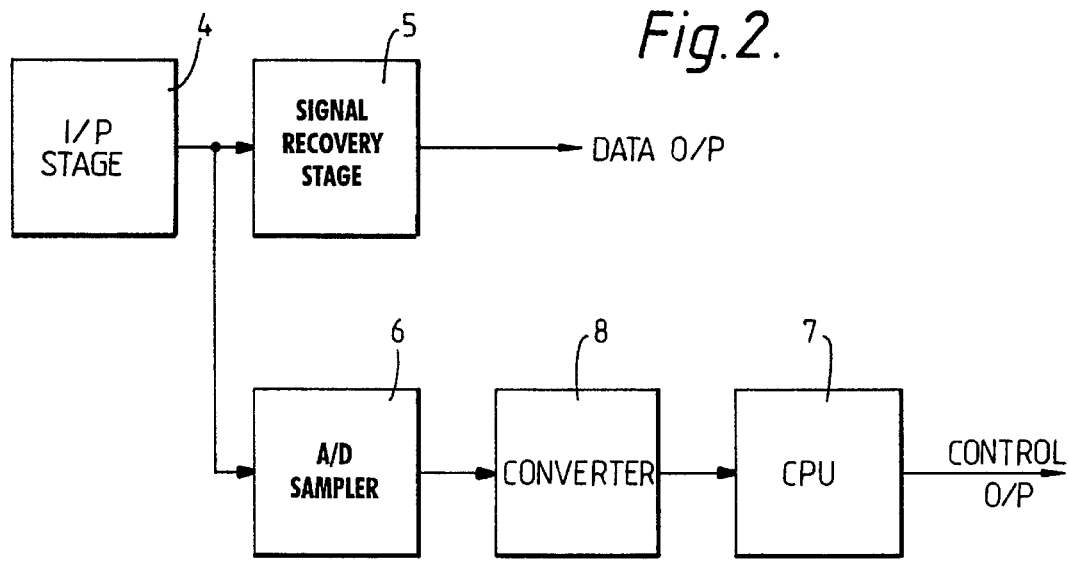
FIG. 2 is a block diagram of a head-end station.

FIG. 2 shows the structure of the head-end station 1. The incoming optical signals are received by an input stage 4 which includes a conventional photo-electric detector. The output from the input stage 4 is branched, going both to a signal recovery stage 5 and to an A/D sampler 6. The sampler 6 operates under the control of the main CPU 7 to sample any selected portion of the incoming signals. The output from the sampler 6 is changed to a datastream of longer word-length and lower bit-rate by a converter 8. The use of the sampler 6 is described in greater detail in U.S. application Ser. No. 07/859,412, filed May 27, 1992 now U.S. Pat. No. 5,341,365 which corresponds to British application, No. 8926548.2 entitled "Passive Optical Network".

Figure 3:
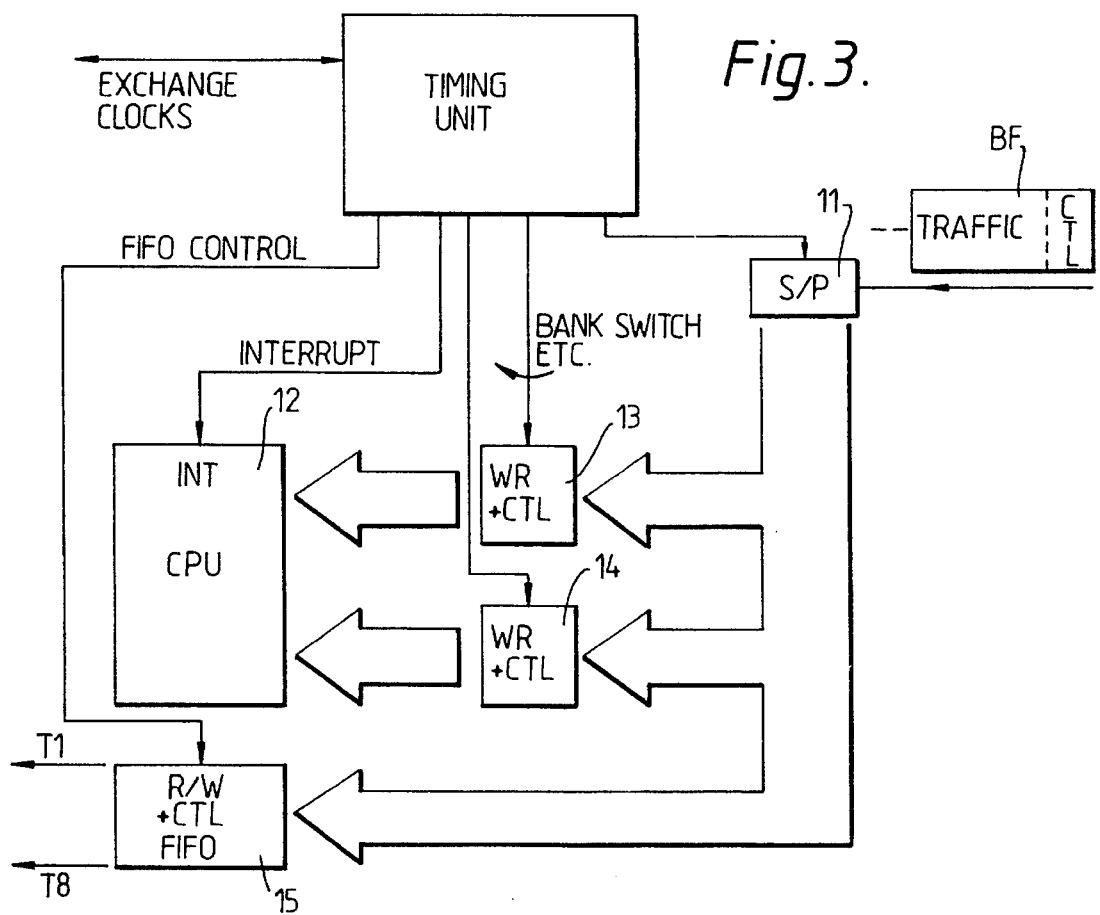
FIG. 3 is a block diagram of a data receiver stage.

The signal recovery stage includes a data receiver as shown in greater detail in FIG. 3.

The serial data input stream is applied to a serial-to-parallel converter 11. The output from the serial-to-parallel converter 11 is communicated via an 8-bit wide data bus at a data rate of 2.56M bytes/s.

In order to prevent read/write conflicts, two dual port parallel line memory buffers (video line memories) are provided for the control processor 12 which has DMA access to both of the buffers. When data is being written from the converter 11 to a given one of the buffers then a flag is set so that the processor reads from the other of the buffers 13, 14.

An exchange interface is provided comprising an 8-bit wide FIFO arranged to provide eight parallel exchange traffic output streams T1 ... T8.

In use each incoming basic frame BF is broadcast both to the control processor buffers 13, 14 and to the exchange interface 15. The operation of the buffers 13, 14 and the interface 15 is synchronised to the overall frame structure and timed so that the control buffers read only the control portion of each basic frame and the exchange interface 15 reads only the traffic portion. The appropriate enable signals are generated by a timing unit locked to the exchange clock.

Figure 4:
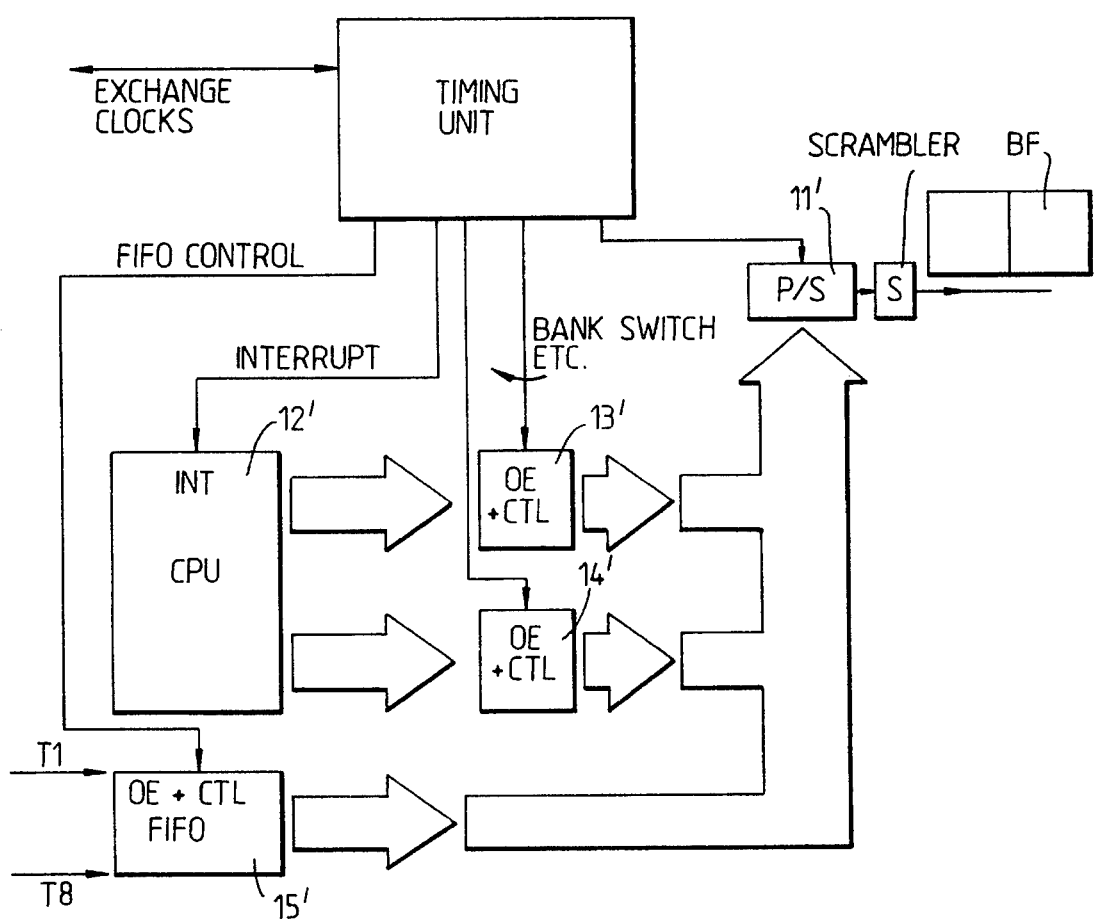
FIG. 4 is a block diagram of a data transmitter stage.

On the transmit side of the head-end station a corresponding structure, shown in FIG. 4 is used. Control data from the control processor 12' are fed via buffers 13', 14' onto a parallel 8-bit bus Traffic data is fed onto the bus from an exchange interface 15'. On the output side of the bus a parallel-to-serial converter 11' forms a serial data stream. As on the receive side, the timing of the control processor buffers and the exchange interface is synchronised to provide traffic and control data in the appropriate portions of each outgoing basic frame BF. The bit order of the output frame is scrambled using a scrambler S. A suitable scrambler is described in the U.S. Pat. No. 5,086,470 issued Feb. 4, 1992, which corresponds to earlier British application no. 8727846, filed Nov. 27, 1987.

FIGS. 5a–5g show timing diagrams for the enable signals to the control buffers and the exchange interface. FIG. 5a shows the CPU interrupt which has the same 10 mS period as the received TDMA frames. FIG. 5b shows the timing of the bank switch which switches alternately between the two video line memories of the data buffer in the transmitter under the control of the timing unit. FIG. 5c shows the enabling signal for the buffer: the signal enables when it is low. It is timed first to go low during the part of the header portion corresponding to the phase-I ranging period. Subsequently the buffer is enabled towards the end of each basic frame in order to capture the control data associated with that basic frame. As shown in FIG. 5d, the enable signal for the other of the video line memories has the same structure but with a shift in phase of one frame's length. The header portion is used for system diagnostics. An encoded signal is transmitted onto the fibre network and the state of the network may be analysed using OTDR techniques.

FIGS. 5e–5g show the timing of the data receiver. The structure is generally analogous to that used on the transmit side, but with a phase offset of 250 microseconds corresponding to the loop delay for the entire network system. The receive buffers when enabled in the header portion capture phase-1 ranging pulses, for use in controlling the timing of transmissions from the terminations, as described above.

I claim:

1. A head-end station for a passive optical network system arranged to transmit and receive downstream and upstream TDMA frames, each TDMA frame including a plurality of basic frames, each basic frame comprising a plurality of traffic bits and a plurality of control bits, the head-end station including a data receiver comprising:

a control processor for receiving control data, a control data buffer responsive to only the plurality of control bits of a received basic frame for providing a parallel control data input to the control processor, a traffic interface responsive only to the plurality of traffic bits of a received basic frame for receiving traffic data, and a serial-to-parallel converter for receiving incoming TDMA frames, the parallel output from the serial-to-parallel converter being connected in common to inputs of the control data buffer and the traffic interface.

2. A head-end station according to claim 1, in which the upstream TDMA frames include a header preceding the plurality of basic frames and wherein the control data buffer reads control data from the serial-to-parallel converter both during the header and subsequently during portions of the basic frames comprising control bits.

3. A head-end station according to claim 2, in which the header includes an initial phase ranging portion and the control data buffer captures ranging pulses received during the phase ranging portion.

4. A head-end station according to claim 1 in which the control data buffer comprises a pair of memory buffers, which are connected in parallel between the serial-to-parallel converter and respective inputs of the control processor, so that when one of the memory buffers is being written to by the serial-to-parallel converter, the control processor reads data from the other of the memory buffers.

5. A head-end station according to claim 4, in which the memory buffers are video line memory buffers.

6. A head-end station for a passive optical network system arranged to transmit and receive downstream and upstream TDMA frames, each TDMA frame including a plurality of basic frames, each basic frame comprising a plurality of traffic bits and a plurality of control bits, the head-end station including a data transmitter comprising:

a control processor for transmitting control data, a control data buffer for receiving a parallel control data stream from the control processor, said control data stream corresponding to the control bits of transmitted basic frames, a traffic interface for transmitting traffic data, said transmitted traffic data corresponding to the traffic bits of transmitted basic frames, and a parallel-to-serial converter for transmitting outgoing TDMA frames, the parallel input to the parallel-to-serial converter being connected in common to outputs of the control data buffer and the traffic interface.

7. A head-end station according to claim 6, in which the downstream TDMA frames include a header preceding the plurality of basic frames and the control data buffer transmits data to the parallel-to-serial converter both during the header and subsequently during portions of the basic frames comprising control bits.

8. A head-end station according to claim 7, in which the header includes a system diagnostic portion and the control data buffer transmits system diagnostic pulses during the system diagnostic portion.

9. A head-end station according to claim 6 in which the control data buffer comprises a pair of memory buffers, which are connected in parallel between the parallel-to-serial converter and respective outputs of the control processor, so that when one of the memory buffers is transmitting data to the parallel-to-serial convertor, the control processor transmits data to the other of the memory buffers.

10. A head-end station according to claim 9, in which the memory buffers are video line memory buffers.

11. A head-end station as in claim 1 comprising a timing unit locked to a clock and generating respectively timed enable signals to the control data buffer and to the traffic interface so as to effect their selective respective reading of the control bits and the traffic bits.

12. A head-end station as in claim 6 comprising a timing unit locked to a clock and generating respectively timed enable pulses to the control data buffer and to the traffic interface so as to effect their selective respective transmission of the control bits and the traffic bits.

* * * * *